Patented July 5, 1932

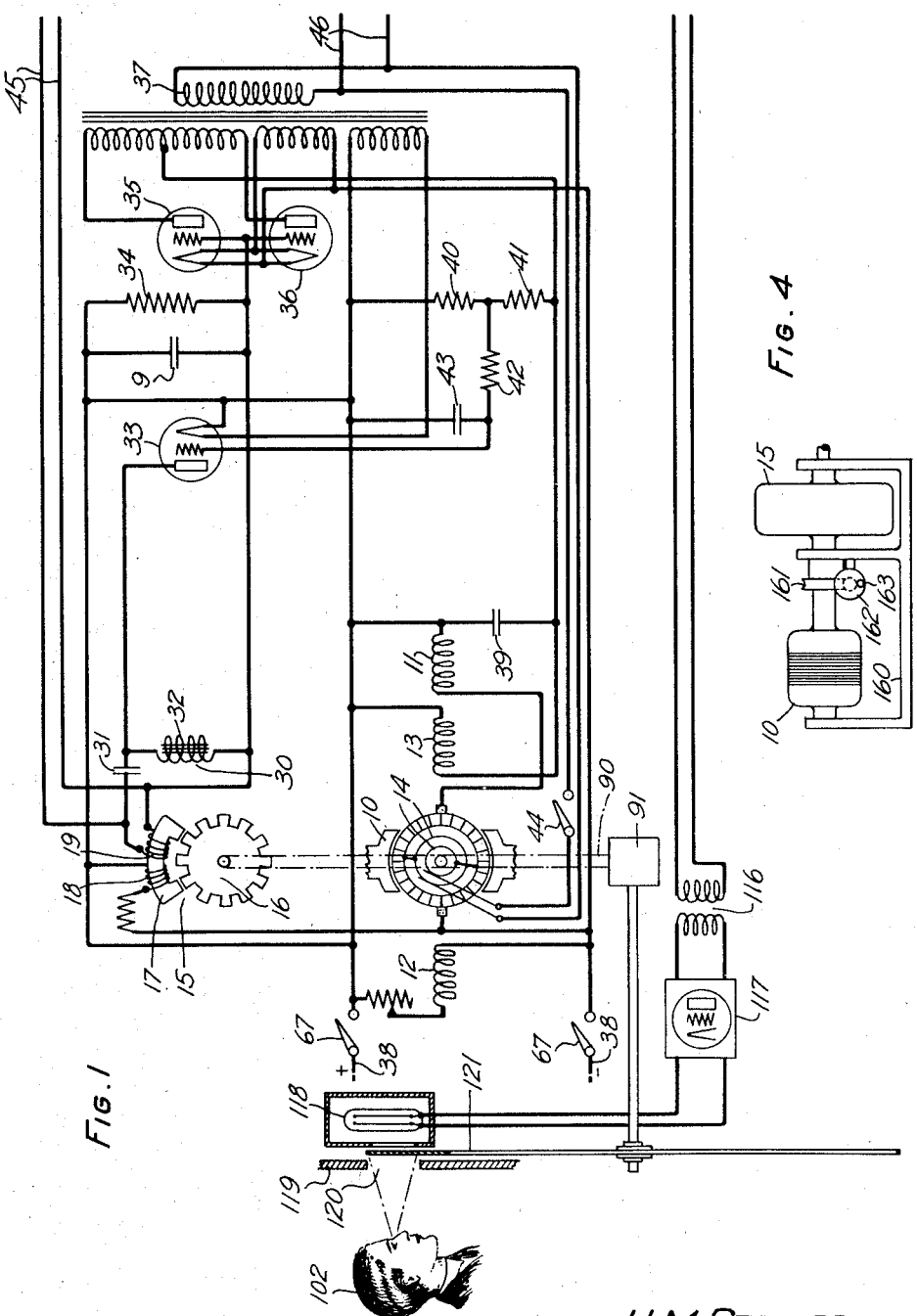

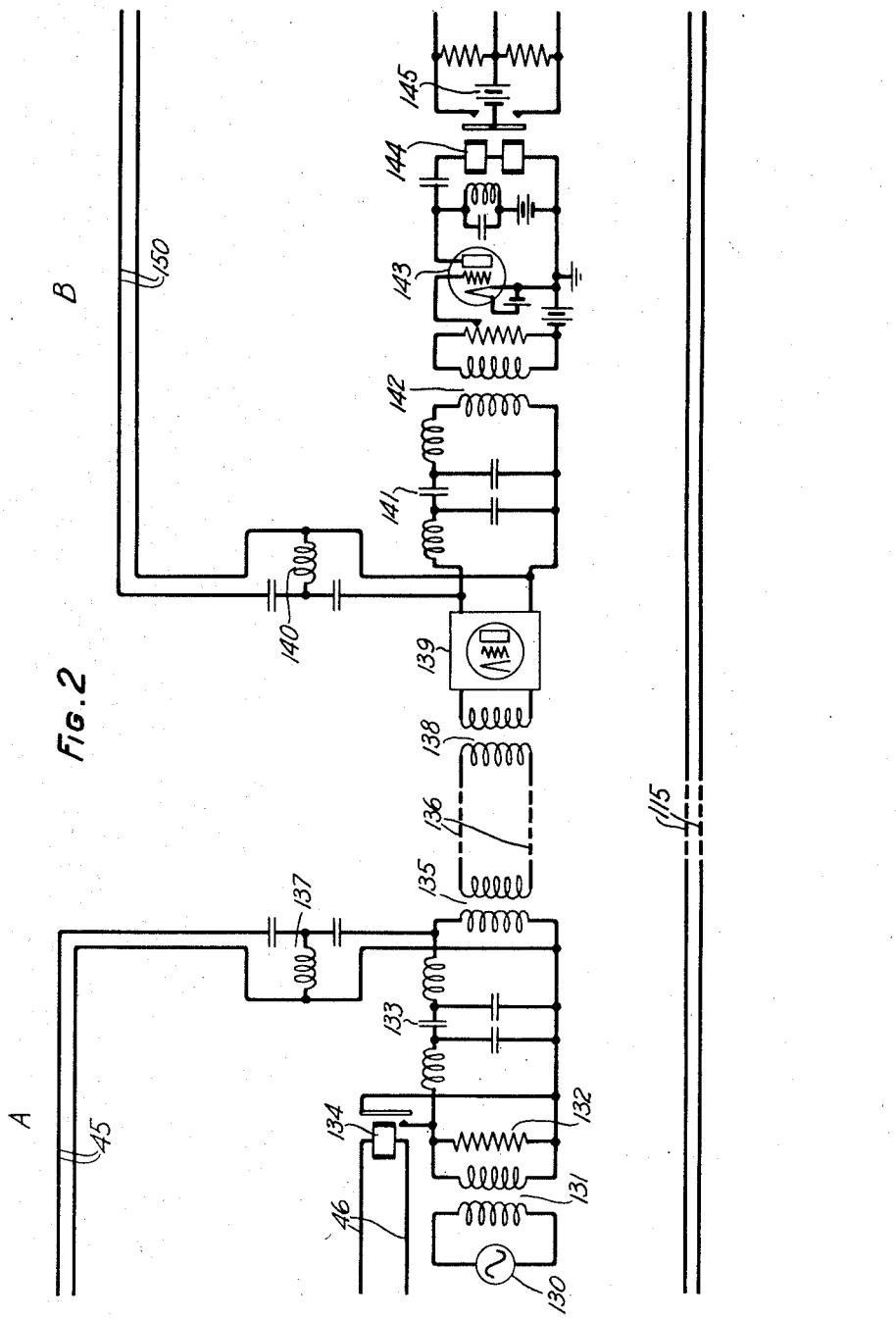

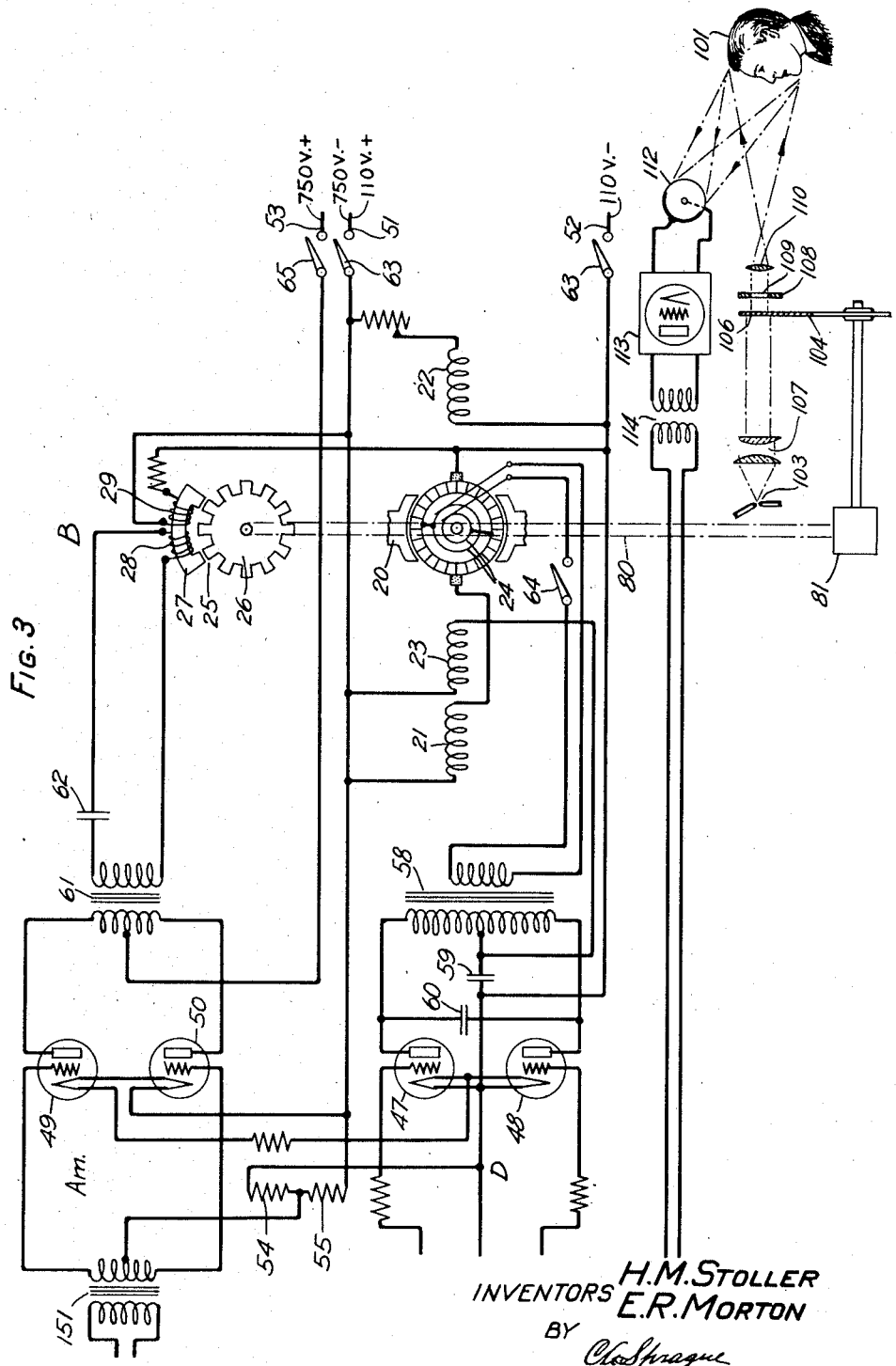

1,866,275

UNITED STATES PATENT OFFICE

HUGH M. STOLLER, OF MOUNTAIN LAKE, NEW JERSEY, AND EDMUND R. MORTON, OF BROOKLYN, NEW YORK, ASSIGNORS TO BELL TELEPHONE LABORATORIES, INCORPORATED, OF NEW YORK, N. Y., A CORPORATION OF NEW YORK

SPEED REGULATOR

Original application filed June 23, 1927, Serial No. 200,799, and in Japan April 5, 1928. Divided and this application filed March 28, 1930. Serial No. 439,683.

This invention relates to speed regulating systems and particularly to systems and methods for synchronously operating moving mechanisms at separated stations and for maintaining these mechanisms in a desired phase relation.

This invention is applicable, for example, to television systems in which the maintenance of close synchronization and a desired phase relation of the moving scanning elements of the transmitter and receiver is required. Such moving elements may be driven by direct current motors in which case means must be provided for maintaining these motors in synchronous operation.

In accordance with this invention a high frequency alternating current generator is mechanically coupled to the motor at the controlling station and the current therefrom is supplied to a similar machine coupled to the direct current motor at the controlled station and is thereby operated as a synchronous motor. The stator of the high frequency machine at the receiving station is provided with a worm gear rotated by a hand operated worm for permitting "framing" of the received image. This arrangement is operable but it has two disadvantages. First, it is difficult to synchronize the machines as it is difficult to close the armature circuit of the high frequency motor at the right phase position with the motors running at very closely the same speed, and, second, the stator of the high frequency machine at the receiving station may have to be turned through a large angle when framing the image, which is difficult to accomplish as the movement can not be made rapidly without throwing the motor out of step. In accordance with a further aspect of the invention, these disadvantages are overcome by the provision of a low frequency interlock in addition to the high frequency interlock above described. The low frequency interlock provides an approximate synchronization within a single limited range of phase positions thereby greatly facilitating the processes of synchronizing on the high frequency and of framing.

The invention is illustrated in the accompanying drawings in which Figs. 1, 2 and 3, placed end to end, show a television system employing the circuit arrangement of the present invention for synchronously operating the driving motors, and Fig. 4 shows the arrangement for mounting the motors at the receiving station.

This invention as illustrated in the drawings comprises a television system in which the scanning discs at the transmitting and receiving stations are driven by two-pole direct current motors individual thereto. The speed of the motor at one station, which will hereinafter be designated as the control station, is maintained constant by a speed regulating arrangement. The direct current motor at the control station is mechanically coupled to a high frequency generator of the inductor type and a low frequency wave is obtained from slip rings connected to opposite commutator bars of the motor. This low frequency wave and the high frequency wave from the synchronous generator are used for synchronizing the operation of the second direct current motor, that is, the one at the controlled station. In order to facilitate the transmission of the low frequency wave, it is caused to modulate by means of a relay the output of an electro-mechanical oscillator and this modulated wave, together with the high frequency wave generated by the synchronous generator, are transmitted over the same line to the controlled station where after being amplified they are separated by wave filters. The modulated wave is passed through a demodulator, the output current of which operates a polarized relay causing its contacts to open and close at the frequency generated at the slip rings of the motor at the control station. The low frequency square wave from the contacts of this relay is supplied to the grid circuit of a three-electrode electric discharge detector or control device, the space current of which is supplied from slip rings connected to opposite commutator bars of the motor at the controlled station and the resulting output current, the value of which is a function of the relative phase of the low frequency waves supplied to the grid and plate circuits, is supplied to a regulating field winding of the controlled direct current motor. In starting this motor, the action of these low frequency waves through the detector circuit is to pull the two motors into step at the desired phase position and to hold them there within limits of about 20 degrees. After this the high frequency wave from the synchronous generator is supplied through an amplifier to a dynamo electric machine of the inductor type mechanically coupled to the controlled direct current motor. This dynamo electric machine may act as a motor, aiding the direct current motor, or as a generator, opposing the direct current motor, in which case the power generated is dissipated as heat in the machine and amplifier tubes. This high frequency interlock maintains a precise phase position between the two driving motors at some one of a number of points within which they were held by the low frequency interlock. The scanning discs may then be adjusted to the relative phase positions required for proper framing of the images by the use of mechanical means which rotates the stator structures of the machines at the receiving station. After the two motors are brought into synchronism and the image framed, it has been found that usually the most satisfactory operation is obtained by using only the high frequency interlock. As is obvious to one skilled in the art, the framing may also be accomplished by the use of suitable mechanical means for rotating the scanning disc on the shaft, or by causing the high frequency machine to slip one pole at a time after disconnecting the low frequency interlock. In order to further increase the accuracy of synchronization, the rotating system at the controlled station is designed to have a moment of inertia small compared to that of control station.

In some cases it may be desirable to transmit the low frequency wave directly from one station to the other, but usually where the interconnecting lines are of any considerable length it is preferable to employ that wave for modulating a wave of higher frequency, as explained above. Obviously, if desired, the two synchronizing waves may be transmitted over separate lines. Obviously, for short lines of negligible impedance and substantial power capacity the machines may be directly connected without the use of devices for synchronizing with the small amounts of power which it is possible to transmit over telephone lines.

The use of both high and low frequency synchronization is desirable for the reason that it is difficult to synchronize on the high frequency alone, since the motors must be brought to the same speed within a certain limit expressed in rate of change of phase position in electrical degrees. For machines of a large number of poles this will be a very minute difference in speed of rotation. By synchronizing first on the low frequency and then on the high frequency much quicker and more certain synchronization is secured.

Another advantage of the system lies in the fact that since the low frequency wave has a frequency of one cycle per revolution of the driving motor, the two motors can be synchronized at only one relatively narrow phase position and they are accurately held at a definite point within the limits of that position by the action of the high frequency wave. A high frequency interlock alone permits the synchronization of the machine at as many phase positions as there are pairs of poles. This feature of the system is particularly advantageous in systems which require that the motors can be interlocked at one definite phase position, for example, as is required to give accurate framing of the picture in a television system as herein described.

In some systems, particularly where the motor at the controlled station displays a marked tendency to vary in speed, due to power supply voltage fluctuations or transmission disturbances such as are to be expected with radio transmission, the continuous use of the double frequency synchronization may be found advantageous. This is desirable if there is probability of the high frequency control being overcome, in which case the machines would have to be synchronized by the operator if the low frequency interlock were not in use. If, on the contrary, it were in use, the machine would immediately resynchronize, with only a momentary disturbance of the transmitted picture.

Referring to the drawings, there are shown two stations A and B which comprise a television system of the type disclosed and claimed in the copending application of F. Gray, Serial No. 181,538, filed April 6, 1927. At the station B, the subject 101 whose image is to be viewed at the receiving station A by the receiving operator 102 is located in front of a scanning apparatus. This apparatus comprises an arc lamp 103 and an optical system for causing a slender pencil of substantially parallel rays of intense light to sweep across the field in front of the scanning apparatus and scan the subject 101 in a series of successive parallel lines. The optical system includes a scanning disc 104 which has a number of small circular apertures 106 arranged in a spiral extending around the disc near its rim. Light from the arc 103 is directed by a lens system 107 so that an intense beam of light passes through each aperture as it moves across the illuminated area of the disc. An opaque screen 108 in front of the disc is provided with a rectangular opening 109 of such width as to admit light from only one aperture at a time. Lens 110 bends the slender pencil of parallel rays passing through the aperture and the opening 109 to form an image of the moving aperture on the subject 101. As a result of this arrangement the subject is completely scanned once for each revolution of the disc in a series of successive parallel lines by a small rapidly moving intensely bright spot of light. As the spot of light passes over the subject, light is diffusely reflected therefrom and a portion of the reflected light falls on the photo-sensitive surface of a large aperture photo-electric cell 112. An electric wave proportional to the intensity of the light is generated. This type of scanning apparatus is described in more detail in the application of Gray referred to above.

The image waves generated in the photoelectric cell are amplified in an electric discharge amplifier 113 and transmitted through a transformer 114 to a line 115 connecting the transmitting station B with the receiving station A.

The scanning disc 104 is driven by a direct current motor 20 connected thereto through the shaft 80 and gear box 81. Obviously, the gear box may be omitted and the disc 104 mounted directly upon the shaft 80 if desired. The motor 20 is arranged to be driven in synchronism with a control motor 10 located at the receiving station A. The relative location of the control and controlled motors is, in general, immaterial, the arrangement shown herein being preferable where a receiving system is arranged to be connected with any one of a number of transmitting stations. The operation of the synchronizing circuit is hereinafter explained in detail.

At the receiving station A the image waves from the line 115 are transmitted through a transformer 116 to an electric discharge amplifier 117 in which they are amplified and fed to a neon glow discharge lamp 118 arranged in front of a scanning disc 121 similar in construction to the scanning disc located at the transmitting station B. The disc is driven by the direct current motor 10 connected thereto through the shaft 90 and the gear box 91. In front of the disc there is located an opaque screen 119 having an opening 120 of such size that at one time only one of the apertures of the disc 121 is in the field of view of the observer 102. The lamp 118 is preferably of the type disclosed in detail in the copending application of F. Gray, Serial No. 138,831, filed October 1, 1926. The optical field defined by the opening 120 and illuminated by the light coming from the lamp 118 through the moving apertures of the disc 121 is viewed by the observer 102 without the aid of any optical system. The observer sees at any instant a single aperture in the same relative position as the spot of light on the subject 101 at the transmitting station B and the brightness of the aperture corresponds to the amount of light reflected from that particular elemental area of the subject. On account of persistency of vision, the observer consequently sees an apparent image of the subject on the front surface of the disc 121, complete views of the subject being transmitted at the rate of about 18 per second so that the subject can be seen in motion.

In order to provide for proper framing of the image the direct current motor 10 and the alternating current generator 15 are mounted in a suitable cradle base 160 as shown in Fig. 4. The mounting is so arranged that the stator structures of both may be simultaneously rotated through a portion of a revolution to adjust the phase position of the scanning disc to obtain proper framing of the image. This is accomplished by means of the worm gear 161 which is attached to the stator structure of both units and which engages the worm 162 mounted in suitable bearings attached to the base 160. By turning the worm 162 in one direction or other by means of the hand wheel 163 the angular position of the stator structures of the machines 10 and 15 may be simultaneously changed, thus causing their armatures and consequently the scanning disc to take the phase position required for proper framing.

The circuit for synchronously operating the driving motors 10 and 20 will now be described. Each of these motors is a direct current motor of the compound wound type having, respectively, series field windings 11 and 21, shunt field windings 12 and 22 and regulating field windings 13 and 23. All of the windings of each motor are cumulative. Each of the motors is provided with a pair of slip rings, 14 and 24, respectively, connected to opposite commutator bars for producing an alternating current of a low frequency of one cycle per revolution of the motor. Alternating current generators of the inductor type 15 and 25 are mechanically coupled to the motors 10 and 20, respectively. The generators comprise, respectively, rotors 16 and 26 and stators 17 and 27 on which are mounted exciting windings 18 and 28 and generating windings 19 and 29. The generator 25 operates as a synchronous motor, as hereinafter described.

The speed of the motor 10 is maintained constant by a regulating circuit of the type described in the patent to H. M. Stoller, No. 1,662,085, issued March 13, 1928. This regulating circuit comprises a tuned circuit 30 consisting of a condenser 31 and an inductance coil 32 connected in series. This circuit is connected to the generating winding 19 and the terminals of the inductance coil 32 are connected in the anode circuit of a three-electrode electric discharge rectifier or detector 33 for supplying space current thereto, the voltage supplied to the anode circuit being proportional to the drop across the inductance coil 32. Connected in series in the anode circuit of the detector 33 is a resistance 34 shunted by condenser 9. This resistance is also connected in the input circuits of the three-electrode electric discharge devices 35 and 36, so that the grid voltage of these devices is controlled by the potential drop across it. The regulating field winding 13 is connected in the anode circuit of the devices 35 and 36 in series with the source 38. The power supply for the cathodes of the detector 33 and the devices 35 and 36 and for the anode circuits of the devices 35 and 36 is obtained from the transformer 37, the primary winding of which is connected to the slip rings 14. The source of power 38 supplies direct current to the motor 10 and also serves as a source of positive grid biasing potential for the devices 35 and 36, the connection being made in series with resistance 34. A condenser 39 is connected in shunt to the regulating field winding 13 to steady the rectified current supplied thereto from the anode circuits of the devices 35 and 36. Two resistances 40 and 41 are connected in series across the regulating field winding 13. The junction of these two resistances is connected to the grid of the detector 33 through a third resistance 42 and a condenser 43 is connected in shunt to the series circuit comprising resistances 40 and 42.

The motor is started by closing the switches 67 and after it is brought up to speed the switch 44 is closed, energizing the detector 33 and the devices 35 and 36 so that the normal speed is held constant by the action of the regulating circuit. The tuned circuit 30 is so designed that the frequency of the wave generated in the winding 19 when the motor is running at the desired speed lies on the falling portion of its resonance curve. When the speed of the motor starts to increase, for example, the voltage drop across the inductance 32 decreases, reducing the space current of the detector 33 and consequently the voltage drop across the resistance 34 which opposes the positive biasing potential impressed on the grids of the devices 35 and 36 from the source 38, thus increasing the regulating field current and limiting the rise in the motor speed. The precision of the circuit is increased by the delayed feed-back to the grid of the detector 33. Any increase in the plate current of the devices 35 and 36 increases the voltage drop across the resistance 40 which is applied through the resistance 42 to the grid of the detector 33. However, due to the action of the condenser 43 and the resistance 42, this voltage does not increase immediately but lags behind by a time which is proportional to the value of the resistance 42 and the capacity of the condenser 43. This time should preferably be of the same order or greater than the natural period of oscillation of the system. The operation of the circuit to prevent any decrease in the speed of the motor is analogous.

The motor 20 is maintained in synchronism with the motor 10 by means of the high frequency wave generated in the winding 19 and the low frequency wave obtained from the slip rings 14. These waves could be transmitted over separate lines to the television transmitting station B, but in the circuit herein shown they are arranged to be transmitted over the same line. As the wave generated at the slip rings 14 is of low frequency (of the order of 17 c. p. s.) it is undesirable to transmit it directly over a telephone line. The output of a higher frequency wave is therefore modulated by this low frequency wave and the resultant modulated wave transmitted to the station B.

This higher frequency wave, which was, as used, of the order of 760 cycles per second, for example, is generated by an oscillator 130 which is preferably of the electromechanical type, as described in the copending application of C. R. Moore, Serial No. 48,223, filed August 5, 1925. The output of the oscillator is connected through the transformer 131, the secondary winding of which is shunted by a high resistance 132, to the input of the low pass filter 133. The terminals of the secondary windings of the transformer 131 are connected to the contact and armature of the relay 134, the winding of which is connected through the leads 46 to the slip rings 14 so that the output of the oscillator is short circuited at the frequency of the wave generated at the slip rings 14, thus modulating the 760 cycle wave from the oscillator. This modulated wave is transmitted through the low pass filter 133 and the transformer 135 to the line 136 which connects the stations A and B. The generator winding 19 is connected through the leads 45 to the input terminals of the high pass filter 137 the output terminals of which are connected to the transformer 135 so that the high frequency wave is also transmitted over the line 136 to the station B.

At the station B the high frequency wave and the modulated wave are transmitted through the transformer 138 to the electric discharge amplifier 139. Connected in parallel to the output of the amplifier 139 are the high pass filter 140 and the low pass filter 141. The high pass filter 140 is designed to select the high frequency wave generated in the winding 19, and the low pass filter 141 is designed to select the modulated wave which is then transmitted through the transformer 142 to the electric discharge demodulator 143.

This demodulator is provided with the usual cathode heating, grid biasing and space current batteries. Connected to the output of the demodulator 143 are the windings of a polarized relay 144, the armature of which is operated by the demodulated current at the frequency of the wave generated at the slip rings 14. The operation of the relay produces a square-top wave of interrupted current from the battery 145. This wave and the high frequency wave in the output of the filter 140 are employed for operating the motor 20 in synchronism with the motor 10.

The synchronizing circuit comprises a push-pull control or detector circuit D employing two three-electrode discharge devices 47 and 48, and a push-pull amplifier $Am$ employing two three-electrode discharge devices 49 and 50. The cathodes of the four devices are supplied with heating current from the 110 volt line 51—52. This line also supplies grid biasing potential to the devices 49 and 50 through the resistances 54 and 55. Space current for the devices 49 and 50 is supplied from the 750 volt line 51—53. Space current is supplied to the devices 47 and 48 from the 110 volt line 51—52 and the transformer 58, the primary winding of which is connected to the slip rings 24. The low frequency wave from the relay 144 is supplied to the input circuit of the detectors 47 and 48. The regulator field winding 23 is connected in the output circuit of the detector D to receive rectified current therefrom, and condenser 59 is provided for by-passing the alternating component of this current. Condenser 60 is for the purpose of power factor correction, neutralizing the lagging current drawn by transformer 58 which is built to draw an unusually heavy magnetizing current. This transformer condenser combination acts to prevent hunting of the regulated motor system. The value of the current supplied to the regulating field 23 depends upon the relative phase of the low frequency waves supplied to the input and output circuits of the detector D so that this portion of the synchronizing circuit operates to maintain the speed of the motor 20 such that the wave from the slip rings 24 is in an approximately constant phase relation with the corresponding low frequency wave from the relay 144 in a manner similar to the operation of the regulating circuit described in the Patent No. 1,663,890 to H. M. Stoller, March 27, 1928. The high pass filter 140 is connected to the amplifier $Am$ through the leads 150 and transformer 151 so that the high frequency is again amplified and supplied through the output transformer 61 to the winding 28, driving the machine 25 as a synchronous motor, thus holding the motor 20 substantially exactly in phase with the motor 10. A condenser 62 is connected in series with the secondary winding of the transformer 61 and the winding 28 to tune the circuit to a frequency a little higher than the synchronous frequency of the machine 25. This tends to prevent hunting as described in the patent to E. R. Morton, No. 1,696,248, dated December 25, 1928.

The operation of the synchronizing circuit is as follows:

The switches 63 are closed to bring the motor up to speed. Then the switch 64 is closed, putting the detector circuit D into operation to bring the motor 20 approximately into step with the motor 10 after which the switch 65 is closed and the machine held in exact synchronism through the action of the high frequency waves. After the machines are thus brought into synchronism the phase position of the scanning disc 121 can be adjusted to the position required for proper framing of the image by turning the hand wheel 163. The low frequency interlock may then be disconnected and the high frequency interlock employed alone for maintaining synchronous operation.

However, as explained above, it may be desirable in some cases to continuously employ both interlocks in order to maintain most satisfactory operation.

In one system in which the frequencies of the low and high frequency waves were respectively 17.7 and 2125 cycles per second, it was found possible to maintain phase positions of the motor within 0.05° under ordinary variations of voltage and load.

For best operation it is desirable that the rotating system associated with the control motor 10 should have a large moment of inertia so as to aid in holding the speed constant while the moment of inertia of rotating system associated with the controlled motor 20 should be relatively smaller so that the motor will readily follow any changes in the speed of the motor 10. This is accomplished in the system herein shown by locating the control motor 10 at the receiving station A at which the large scanning disc 121 is used and locating the controlled motor 20 at the transmitting station where the smaller scanning disc 104 is used.

This application is a division of application Serial No. 200,799, filed June 23, 1927, which in turn is a continuation in part of application Serial No. 181,314, filed April 6, 1927.

What is claimed is:

1. In combination, two driving motors, means for deriving a wave of low frequency from and proportional to the speed of one of said motors, means operated by said one motor for generating a wave of high frequency proportional to the speed of said one motor, means for deriving a wave of low frequency from and proportional to the speed of the other of said motors, a high frequency synchronous motor mechanically connected to said other motor, means controlled by the phase difference of said low frequency waves for regulating the speed of said other motor, and connections for supplying said high frequency wave to said synchronous motor.

2. A combination according to the preceding claim in which the means for regulating the speed of said other driving motor comprises an electrical discharge detector having input and output circuits, and connections for supplying the low frequency waves to said input and output circuits, respectively, to obtain an output current proportional to the phase difference of said low frequency waves.

3. A combination according to claim 1 in which the low frequency wave has a frequency of one cycle per revolution of said one driving motor.

4. In combination, a direct current motor having a commutator, slip rings connected to opposite bars of said commutator for obtaining a wave of a frequency proportional to the speed of said motor, a high frequency generator mechanically coupled to said motor, means for regulating the speed of said motor, a second direct current motor having a commutator, slip rings connected to opposite bars of said commutator for obtaining a wave of a frequency proportional to the speed of said second motor, an electric discharge detector having input and output circuits, means for supplying waves from the slip rings of said first and second motors to said input and output circuits, respectively, a regulating field winding for said second motor connected in the output circuit of said detector, a high frequency synchronous motor mechanically coupled to said second direct current motor, and means for supplying waves from said generator to said synchronous motor.

5. The method of regulating the speed of a moving element which comprises utilizing one simple wave of low frequency for roughly controlling the instantaneous speed of said element, utilizing a second simple wave of high frequency to effect a fine driving control of the instantaneous speed of said element, and discontinuing the use of said wave of low frequency.

6. The method of synchronously operating two driving elements which comprises transmitting a wave of relatively low frequency proportional to the speed of one of said elements to the other element, utilizing said wave in controlling the operation of the other of said elements to bring said elements approximately into a desired phase relation, transmitting a wave of comparatively high frequency proportional to the speed of said first element to the other element, utilizing said high frequency wave in controlling the operation of said second element to effect a high degree of sychronous operation, and discontinuing the use of said low frequency control.

7. The method of operating a motor in synchronism with a second motor which comprises utilizing the phase relation of a wave of low frequency proportional to the speed of said second motor and a second low frequency wave of frequency proportional to the speed of said first motor in controlling the speed of said first motor to bring said first motor approximately into a desired phase relation with respect to said second motor, utilizing a wave of high frequency proportional to the speed of said second motor in controlling the speed of said first motor to maintain substantially exact synchronism and discontinuing the use of said low frequency control.

8. The method of regulating the speed and phase of one moving element with respect to another which comprises utilizing one simple wave of low frequency for bringing one of the moving elements approximately into a desired phase relation with respect to the other, utilizing a second simple wave of relatively high frequency for maintaining the moving element at one of a plurality of positions within a range determined by said low frequency wave, and discontinuing the use of said low frequency control.

9. In combination, a rotatable element at a station, means located away from said station for generating a simple wave of low frequency and a simple wave of high frequency, a direct current motor for rotating said element, means for modulating a higher frequency wave with said low frequency wave and for transmitting said modulated wave and the high frequency wave over one circuit to said station, means at said station for demodulating said modulated wave, means responsive to said low frequency wave and means at said station responsive to said high frequency wave, said two responsive means serving jointly to control the driving of said rotatable element.

10. A combination, according to claim 9 in which said means responsive to a low frequency wave is associated with said direct current motor.

11. A combination in accordance with claim 9 in which said means responsive to a low frequency wave controls a driving torque greater than that supplied by said means responsive to said high frequency wave.

12. In combination, a plurality of rotatable elements, a plurality of direct current motors one of which is associated with each of said rotatable elements for driving it approximately in synchronism with another of said rotatable elements, a high frequency motor mechanically coupled to each of said direct current motors for maintaining said rotatable elements more accurately in synchronism, and means responsive to a low frequency simple wave associated with each of said direct current motors for bringing said rotatable elements approximately into a desired phase relation with respect to each other.

13. In combination, a plurality of movable elements separated by a considerable distance, a motor for driving each of said movable elements, a source of waves having a frequency of one cycle per revolution of one of said movable elements, a source of carrier waves, means for modulating the carrier waves from said source in accordance with waves from said first mentioned source of waves, means for demodulating said modulated carrier waves, a line connecting said modulating and demodulating means, means controlled by said demodulated wave for pulling one of said motors approximately into a desired phase relation with respect to the other motor, a source of waves of high frequency proportional to the speed of said second motor, a synchronous motor mechanically coupled to said first motor, and means including at least a portion of the line connecting said modulating and demodulating means for impressing said high frequency wave on said synchronous motor to maintain said first motor in substantially exact synchronism with said second motor.

In witness whereof, we hereunto subscribed our names this 13th day of March, 1930.

HUGH M. STOLLER.
EDMUND R. MORTON.